United States Patent
Shimahara

(10) Patent No.: US 11,776,302 B2
(45) Date of Patent: *Oct. 3, 2023

(54) BIOMETRIC RECOGNITION APPARATUS AND BIOMETRIC RECOGNITION METHOD

(71) Applicant: NEC CORPORATION, Tokyo (JP)

(72) Inventor: Tatsuya Shimahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 61 days.

This patent is subject to a terminal disclaimer.

(21) Appl. No.: 17/502,925

(22) Filed: Oct. 15, 2021

(65) Prior Publication Data
US 2022/0036040 A1 Feb. 3, 2022

Related U.S. Application Data

(63) Continuation of application No. 16/322,233, filed as application No. PCT/JP2018/034075 on Sep. 13, 2018, now Pat. No. 11,170,197.

(30) Foreign Application Priority Data

Oct. 13, 2017 (JP) .................................. 2017-199167

(51) Int. Cl.
*G06V 40/12* (2022.01)
*G06V 10/771* (2022.01)

(52) U.S. Cl.
CPC ........ *G06V 40/1353* (2022.01); *G06V 10/771* (2022.01); *G06V 40/1347* (2022.01); *G06V 40/1365* (2022.01)

(58) Field of Classification Search
CPC ... G06K 9/00087; G06K 9/00067; G06K 9/66
See application file for complete search history.

(56) References Cited

U.S. PATENT DOCUMENTS

| 6,091,839 A | 7/2000 | Uchida |
| 7,853,047 B2 | 12/2010 | Hara |

(Continued)

FOREIGN PATENT DOCUMENTS

| JP | 2002-259911 A | 9/2002 |
| JP | 2007/048000 A | 2/2007 |

(Continued)

OTHER PUBLICATIONS

Japanese Office Action for JP Application No. 2021-065046 dated Mar. 16, 2022 with English Translation.

(Continued)

*Primary Examiner* — Lixi C Simpson

(57) ABSTRACT

A biometric recognition apparatus and fingerprint feature extraction method can automatically optimize parameters used for extracting a feature template from a biometric image. The biometric recognition apparatus includes: a teacher data generation unit that generates a genuine pair and an imposter pair of first and second biometric images; a learning data generation unit that uses a plurality of different temporary parameters to extract feature templates from the first biometric image and the second biometric image; and an optimum solution determination unit that calculates a score separation degree on the temporary parameter basis based on a first score representing a similarity degree of a pair of the feature templates extracted from the genuine pair and a second score representing a similarity degree of a pair of the feature templates extracted from the imposter pair and determines the temporary parameter based on a level of the score separation degree.

9 Claims, 8 Drawing Sheets

LATENT FINGERPRINT

GENUINE PAIR

TENPRINT FINGERPRINT

(56) References Cited

U.S. PATENT DOCUMENTS

| | | | |
|---|---|---|---|
| 8,019,132 B2 | 9/2011 | Hara | |
| 2012/0002846 A1* | 1/2012 | Yokoi | .................. G06V 10/145 |
| | | | 382/115 |
| 2013/0216106 A1 | 8/2013 | Hara et al. | |
| 2013/0287271 A1 | 10/2013 | Harper | |
| 2017/0004351 A1 | 1/2017 | Kim et al. | |

FOREIGN PATENT DOCUMENTS

| | | |
|---|---|---|
| JP | 2009-076020 A | 4/2009 |
| JP | 2012-221476 A | 11/2012 |
| JP | 2016-062253 A | 4/2016 |
| WO | 2010/106644 A1 | 9/2010 |
| WO | 2010/110181 A1 | 9/2010 |
| WO | 2012/063708 A1 | 5/2012 |

OTHER PUBLICATIONS

Cao et al., "Automated Latent Fingerprint Recognition", Apr. 6, 2017, XP80761259A, pp. 1-13 (total 13 pages).
Communication dated Oct. 21, 2020 from European Patent Office in EP Application No. 18867156.4.
Poh et al., "D3.3: Description of Metrics For the Evaluation of Biometric Performance", BEAT, Aug. 31, 2012, XP55737504A, pp. 1-22 (total 22 pages).
International Search Report for PCT/JP2018/034075 dated Nov. 13, 2018 [PCT/ISA/210].
Written Opinion for PCT/JP2018/034075 dated Nov. 13, 2018 [PCT/ISA/237].

* cited by examiner

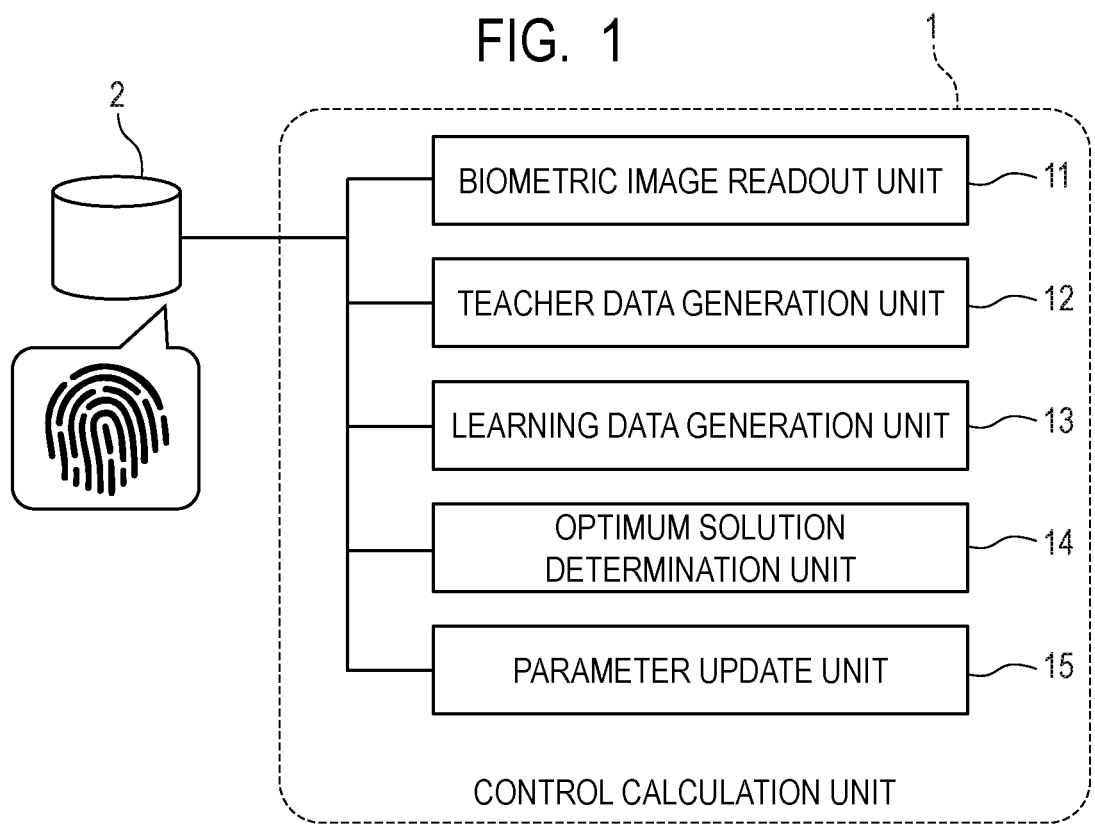

FIG. 2A
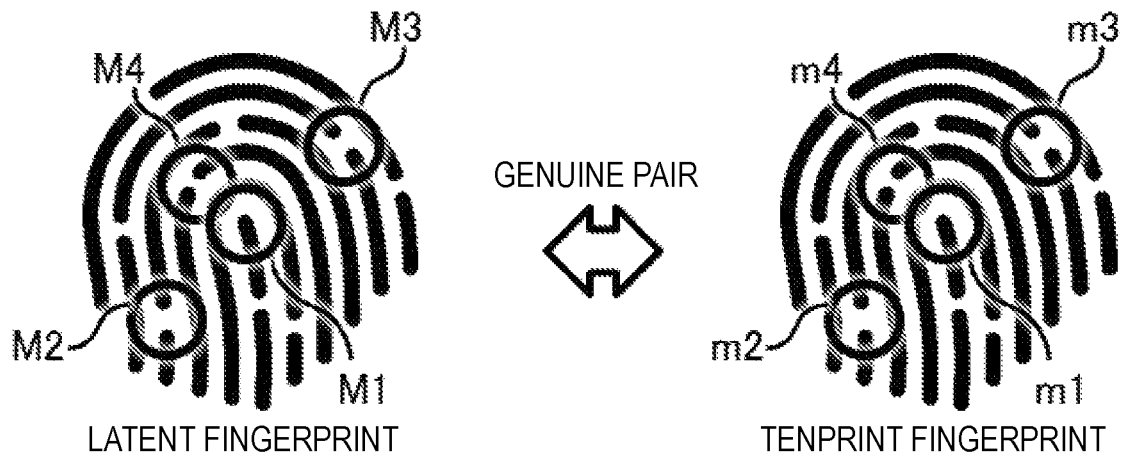
LATENT FINGERPRINT — GENUINE PAIR — TENPRINT FINGERPRINT
FIG. 2B
FIRST BIOMETRIC IMAGE
(LATENT FINGERPRINT)
SECOND BIOMETRIC IMAGE
(TENPRINT FINGERPRINT)
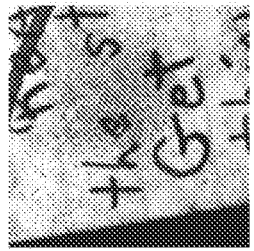
F1
GENUINE PAIR
F1 - f1
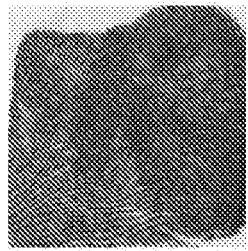
f1
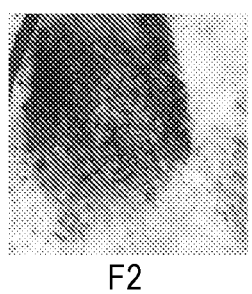
F2
GENUINE PAIR
F2 - f2
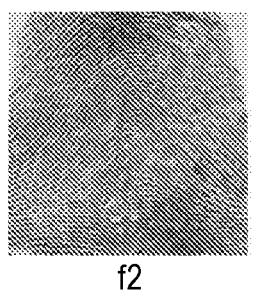
f2
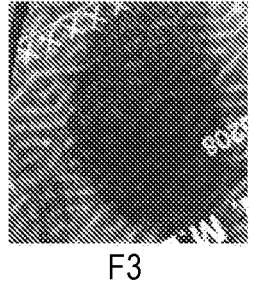
F3
GENUINE PAIR
F2 - f2
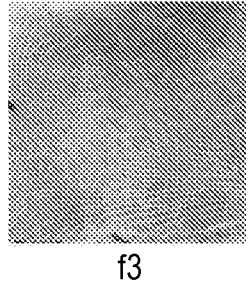
f3

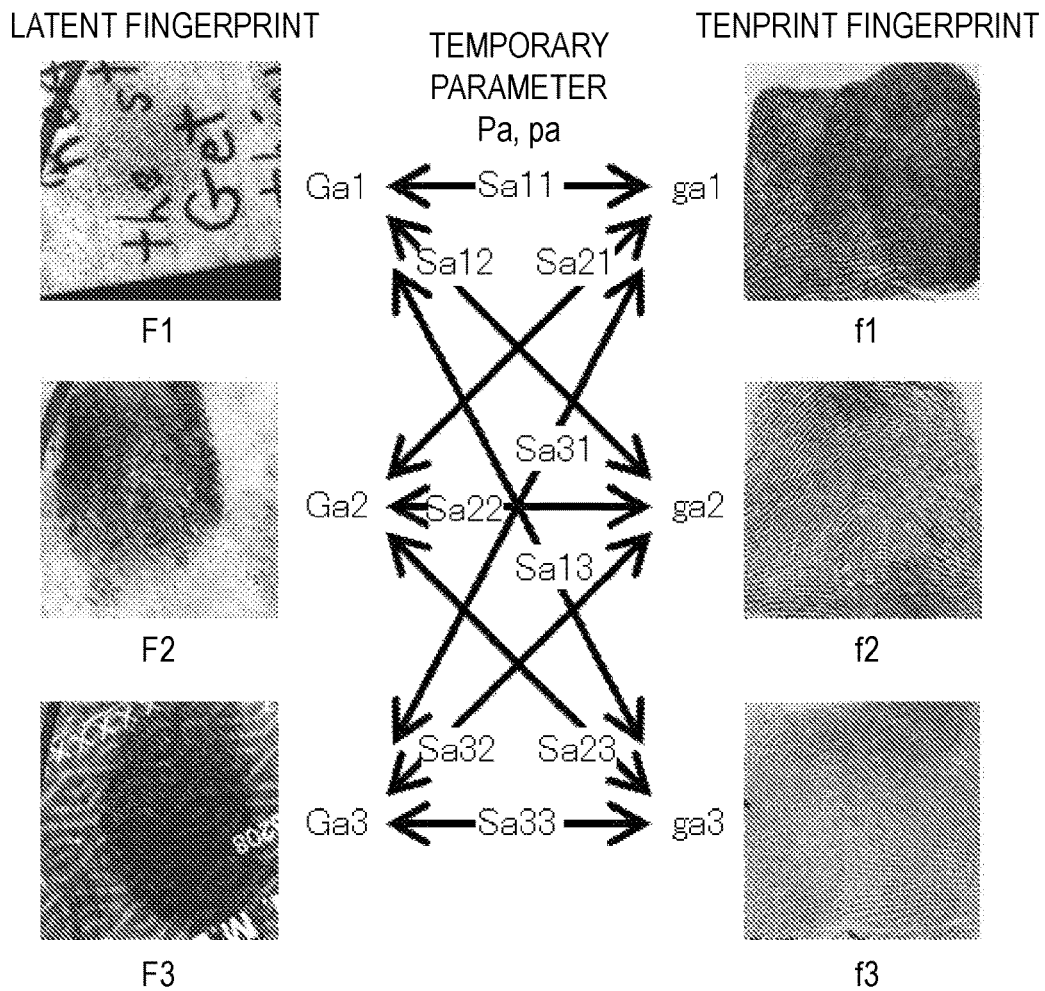

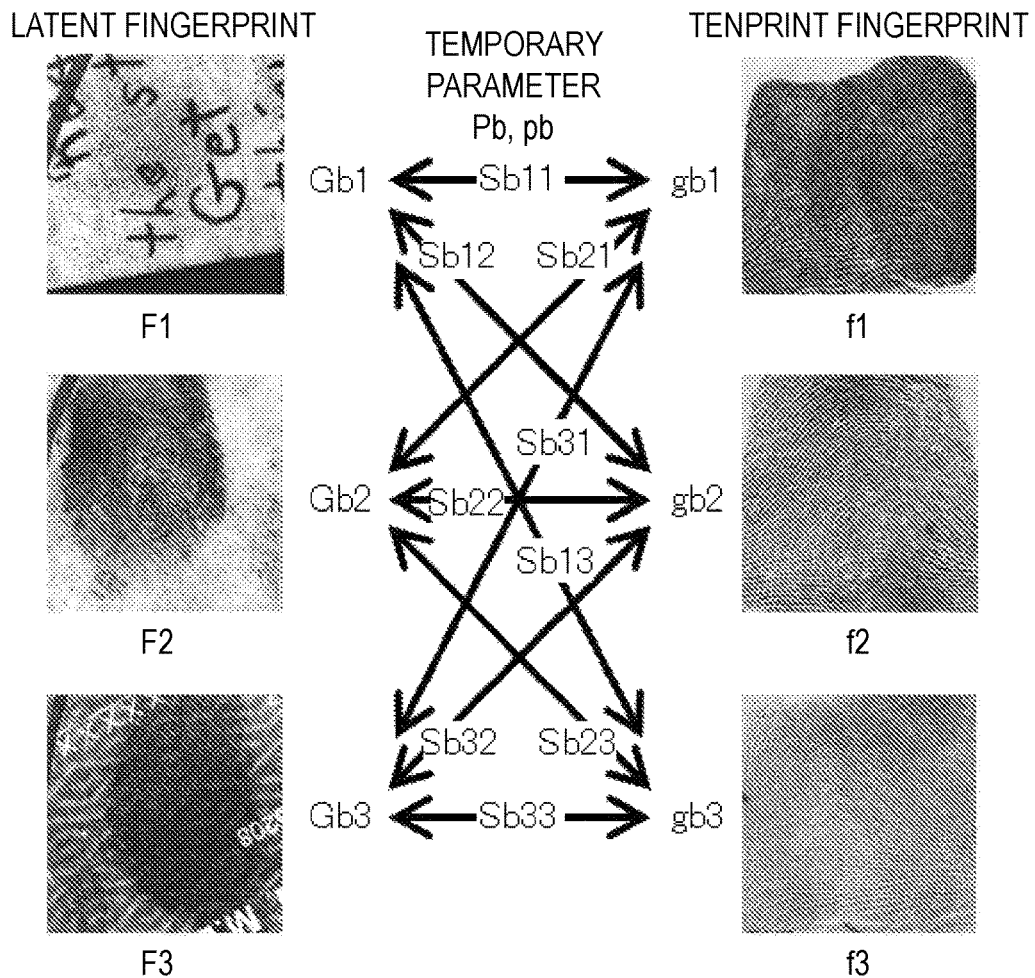

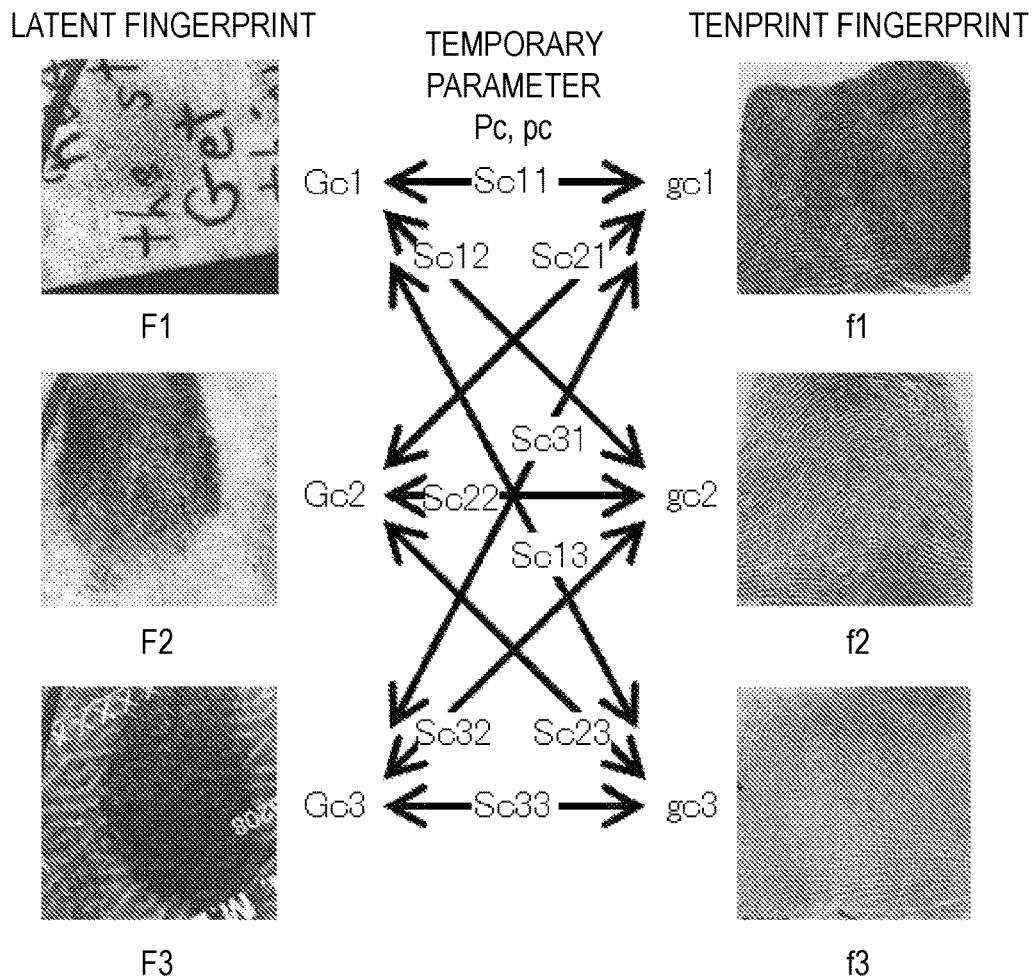

FIG. 7

| TEMPORARY PARAMETER P(A,B,C) | | (1,1,1) | (1,2,1) | (2,1,1) |
|---|---|---|---|---|
| LATENT FINGERPRINT Fi - TENPRINT FINGERPRINT fj | | $S_{ij} = A \cdot S_{aij} + B \cdot S_{abij} + C \cdot S_{cij}$ | | |
| GENUINE PAIR | F1 - f1 | 1000 (RANKED TOP) | 2000 (RANKED TOP) | 2300 (RANKED TOP) |
| IMPOSTER PAIR | F1 - f2 | 200 | 100 | 350 |
| | F1 - f3 | 0 | 0 | 0 |
| GENUINE PAIR | F2 - f2 | 1500 (RANKED TOP) | 1800 (RANKED TOP) | 1600 (RANKED TOP) |
| IMPOSTER PAIR | F2 - f1 | 100 | 30 | 150 |
| | F2 - f3 | 400 | 50 | 550 |
| GENUINE PAIR | F3 - f3 | 500 (RANKED SECOND) | 800 (RANKED TOP) | 1000 (RANKED SECOND) |
| IMPOSTER PAIR | F3 - f1 | 800 | 10 | 1100 |
| | F3 - f2 | 10 | 5 | 30 |
| RATIO OF RANKED TOP : S | | 2/3 | 3/3 | 2/3 |

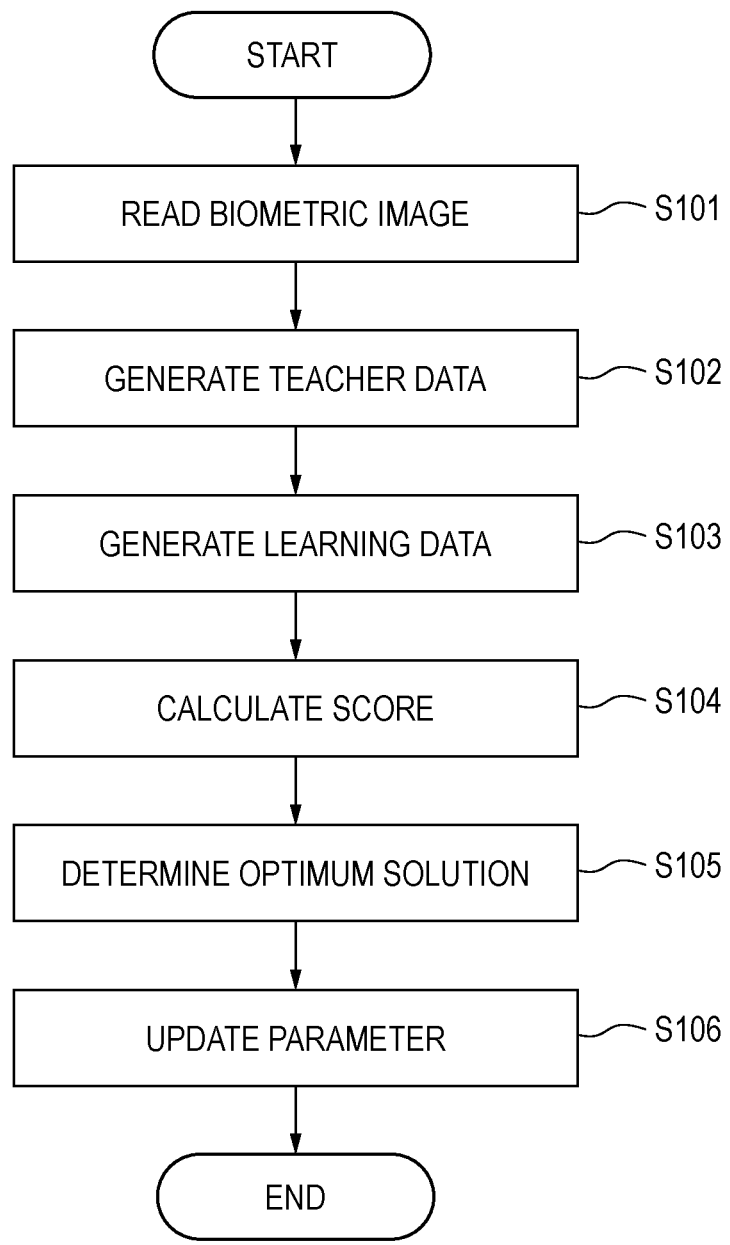

BIOMETRIC RECOGNITION APPARATUS AND BIOMETRIC RECOGNITION METHOD

CROSS REFERENCE TO RELATED APPLICATIONS

This application is a Continuation of U.S. application Ser. No. 16/322,233, filed Jan. 31, 2019, which is a National Stage of International Application No. PCT/JP2018/034075 filed Sep. 13, 2018, claiming priority based on Japanese Patent Application No. 2017-199167 filed Oct. 13, 2017.

TECHNICAL FIELD

The present invention relates to a biometric recognition apparatus and a biometric recognition method, in particular, relates to a technology of automatically optimizing parameters used for extracting a feature template from a biometric image.

BACKGROUND ART

Fingerprints or palm prints formed by ridges on skin of a finger or a palm have uniqueness and permanence in the life. Thus, fingerprints or palm prints have been used in criminal investigation or the like as a biometric recognition scheme for identifying individuals.

Collected images such as tenprint fingerprints collected in advance for criminal investigation, latent fingerprints collected at a crime scene, or the like are registered in advance in a database and read in criminal investigation, and the feature template thereof is extracted. In Patent Literature 1, a noise reduction process or an enhancement process is performed when a feature template is extracted from a collected image, and thereby the feature template of a fingerprint is clarified to improve the verification accuracy of the fingerprint.

CITATION LIST

Patent Literature

PTL 1: Japanese Patent Application Laid-Open No. 2007-048000

SUMMARY OF INVENTION

Technical Problem

Parameters such as a combination of a noise reduction process and an enhancement process, a weighting, and the like used when a feature template is extracted from a biometric image may have different optimum values depending on a collection method of a fingerprint (for example, quality of ink or a sheet in an ink scheme) or the like. Thus, parameters used for extracting a feature template from a biometric image are required to be set suitably in accordance with an operation style of a biometric recognition apparatus.

However, setting parameters used for extracting a feature template from a biometric image for each operation style requires time and labor, and in addition, the optimum parameters are often not known before trial and error in the actual operation. In particular, since the operation style may often be changed during operation, biometric images collected in various operation styles may be included in the database. Thus, there is a problem of difficulty in maintaining optimized parameters used for extracting a feature template from a biometric image.

Solution to Problem

According to one example aspect of the present invention, provided is a biometric recognition apparatus including: a teacher data generation unit that generates a genuine pair and an imposter pair of a first biometric image and a second biometric image; a learning data generation unit that uses a plurality of different temporary parameters to extract feature templates from the first biometric image and the second biometric image; and an optimum solution determination unit that calculates a score separation degree on the temporary parameter basis based on a first score representing a similarity degree of a pair of the feature templates extracted from the genuine pair and a second score representing a similarity degree of a pair of the feature templates extracted from the imposter pair and determines the temporary parameter based on a level of the score separation degree.

According to another example aspect of the present invention, provided is a biometric recognition method used in a control calculation unit of a biometric recognition apparatus, and the biometric recognition method includes: a teacher data generation step of generating a genuine pair and an imposter pair of a first biometric image and a second biometric image; a learning data generation step of using a plurality of different temporary parameters to extract feature templates from the first biometric image and the second biometric image; and an optimum solution determination step of calculating a score separation degree on the temporary parameter basis based on a first score representing a similarity degree of a pair of the feature templates extracted from the correct solution pair and a second score representing a similarity degree of a pair of the feature templates extracted from the imposter pair and determining the temporary parameter based on a level of the score separation degree.

Advantageous Effects of Invention

According to the present invention, a biometric recognition apparatus and a fingerprint feature extraction method that can automatically optimize parameters used for extracting a feature template from a biometric image can be provided.

BRIEF DESCRIPTION OF DRAWINGS

FIG. 1 is a block diagram schematically illustrating a configuration of a biometric recognition apparatus according to a first example embodiment.

FIG. 2A is a diagram illustrating an example of a teacher data generation process in the biometric recognition apparatus according to the first example embodiment.

FIG. 2B is a diagram illustrating an example of a teacher data generation process in the biometric recognition apparatus according to the first example embodiment.

FIG. 4A is a first diagram illustrating an example of a score calculation process in the biometric recognition apparatus according to the first example embodiment.

FIG. 4B is a first diagram illustrating an example of a score calculation process in the biometric recognition apparatus according to the first example embodiment.

FIG. 5A is a second diagram illustrating an example of a score calculation process in the biometric recognition apparatus according to the first example embodiment.

FIG. 5B is a second diagram illustrating an example of a score calculation process in the biometric recognition apparatus according to the first example embodiment.

FIG. 6A is a third diagram illustrating an example of a score calculation process in the biometric recognition apparatus according to the first example embodiment.

FIG. 6B is a third diagram illustrating an example of a score calculation process in the biometric recognition apparatus according to the first example embodiment.

FIG. 7 is a diagram illustrating an example of an optimum solution determination process in the biometric recognition apparatus according to the first example embodiment.

FIG. 8 is a diagram illustrating a flowchart of a biometric recognition method according to the first example embodiment.

DESCRIPTION OF EMBODIMENTS

Figure 3A:
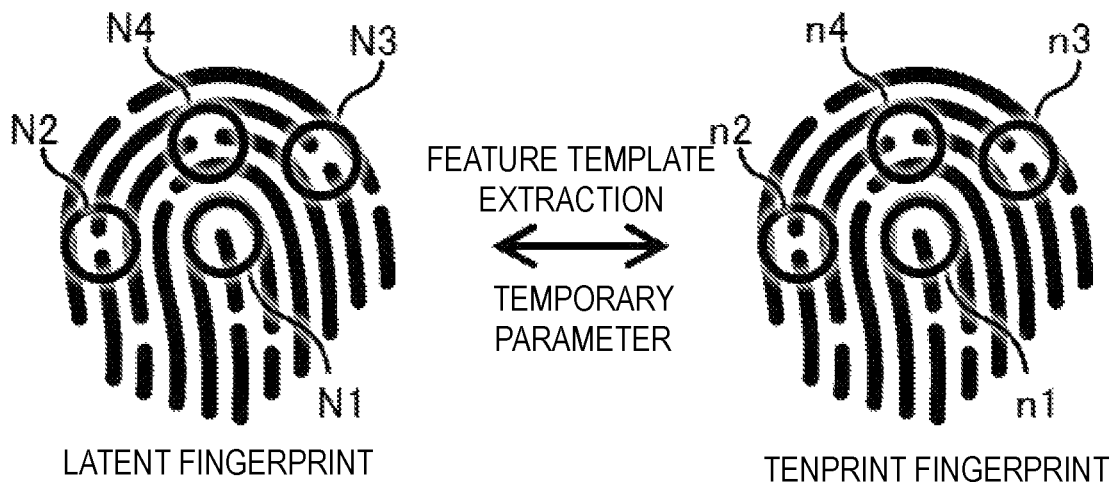
FIG. 3A is a diagram illustrating an example of a learning data generation process in the biometric recognition apparatus according to the first example embodiment.

Preferred example embodiments of the present invention will be described below by using drawings. Note that the present invention is not limited to the following example embodiments and can be modified as appropriate within the scope not departing from the spirit thereof. Throughout the drawings, components having the same or corresponding function are labeled with the same references, and the description thereof may be omitted or simplified.

First Example Embodiment

FIG. 1 is a block diagram schematically illustrating a configuration of a biometric recognition apparatus according to a first example embodiment. The biometric recognition apparatus of the present example embodiment has a control calculation unit 1 and a storage unit 2.

The control calculation unit 1 is a semiconductor IC having a microprocessor and a memory used for executing a program stored in the storage unit 2 and performing control and calculation in the biometric recognition apparatus. The control calculation unit 1 has a biometric image read unit 11, a teacher data generation unit 12, a learning data generation unit 13, an optimum solution determination unit 14, and a parameter update unit 15.

The storage unit 2 is a storage device such as a flash memory, an HDD, or the like in which a program executed by the control calculation unit 1 or data required for executing a program is stored. In the storage unit 2, biometric images such as a tenprint fingerprint collected in advance for criminal investigation, a latent fingerprint collected at a crime scene, or the like have been registered as a database.

The biometric image read unit 11 reads a plurality of biometric images out of biometric images registered as a database in the storage unit 2 in order to perform machine learning for automatically optimizing parameters used for feature template extraction. The automatic optimization of parameters described below may be performed as a back ground process of a usual identification process or a batch process performed at night or the like.

Note that, while a biometric image may be a collected image of a tenprint fingerprint collected in advance for criminal investigation or a collected image of a latent fingerprint collected at a crime scene in the following description, the present example embodiment is not limited thereto. The biometric image may be a collected image of veins of a finger, an iris, or the like. Further, a biometric image may be an image obtained by directly reading biometric information by using a camera or the like or an image obtained by reading biometric information stamped on a sheet with ink or the like by using a scanner.

The teacher data generation unit 12 generates a pair of a first biometric image and a second biometric image used as teacher data in a learning data generation process described below. In the present example embodiment here, a collected image of a latent fingerprint is the first biometric image, and a collected image of a tenprint fingerprint is the second biometric image.

More specifically, the teacher data generation unit 12 selects a pair of the first biometric image and the second biometric image which are determined as being based on the same finger as a genuine pair out of a plurality of biometric images read from the biometric image read unit 11. Further, the teacher data generation unit 12 selects a pair of the first biometric image and the second biometric image which are not determined as being based on the same finger as an imposter pair.

The teacher data generation unit 12 is not necessarily required to perform a dedicated process for generating teacher data but may utilize one process in a usual identification operation as one process performed in the teacher data generation unit 12. For example, the teacher data generation unit 12 may select, directly as a genuine pair, a pair of the first biometric image and the second biometric image identified in advance as being based on the same finger by a latent print examiner or the like who is a user of the biometric recognition apparatus.

The learning data generation unit 13 uses a plurality of different temporary parameters from the first biometric image and the second biometric image used for teacher data generated by the teacher data generation unit 12 and generates a feature template used for learning data. In the present example embodiment here, a group of feature points (end points or branch points of fingerprint ridges) extracted from a collected image of a latent fingerprint or a tenprint fingerprint is a feature template used for learning data.

Note that the term of parameter is used in a broad meaning in the present example embodiment. The parameter may include a combination and a weight of algorithms of a noise reduction process, an enhancement process, and other processes in image extraction.

The optimum solution determination unit 14 calculates a score separation degree on a temporary parameter basis based on a first score representing a similarity degree in a pair of feature templates extracted from a genuine pair and a second score representing a similarity degree in a pair of feature templates extracted from an imposter pair. The optimum solution determination unit 14 then determines the temporary parameter as the optimum solution based on the level of the score separation degree. The parameter update unit 15 updates a parameter stored in the storage unit 2 with a temporary parameter determined as the optimum solution.

FIG. 2A and FIG. 2B are diagrams illustrating an example of a teacher data generation process in the biometric recognition apparatus according to the first example embodiment. The teacher data generation unit 12 selects a pair of the first biometric image and the second biometric image which are determined as being based on the same finger as a genuine pair out of a plurality of biometric images read from the biometric image read unit 11. Further, the teacher data generation unit 12 selects a pair of the first biometric image and the second biometric image which are not determined as being based on the same finger as an imposter pair.

Note that, while FIG. 2A illustrates a collected image of a latent fingerprint F and collected image of a tenprint fingerprint f generated by the teacher data generation unit 12 by using the same figure, the actual collected image of the latent fingerprint F is less clear than the collected image of the tenprint fingerprint f. While an example of a generation method of a genuine pair and an imposter pair performed by the teacher data generation unit 12 will be described below, the present example embodiment is not limited to such an example.

The teacher data generation unit 12 generates, as teacher data, a genuine pair of a collected image of the latent fingerprint F and a collected image of the tenprint fingerprint f which have been identified as being based on the same finger by a latent print examiner or the like who is the user of the biometric recognition apparatus. Further, the teacher data generation unit 12 generates, as teacher data, an imposter pair of a collected image of the latent fingerprint F and a collected image of the tenprint fingerprint f which have not been identified as being based on the same finger by a latent print examiner or the like who is the user of the biometric recognition apparatus.

FIG. 2A illustrates a feature point group {M1, M2, . . . } of the collected image of the latent fingerprint F that is the first biometric image and a feature point group {m1, m2, . . . } of the collected image of the tenprint fingerprint f that is the second biometric image for reference. While, in general, a latent print examiner selects a genuine pair and an imposter pair of the first biometric image and the second biometric image by referencing the feature point group {M1, M2, . . . } and the feature point group {m1, m2, . . . } as illustrated in FIG. 2A, the present example embodiment is not limited thereto.

FIG. 2B illustrates an example of a plurality of genuine pairs F1-f1, F2-f2, and F3-f3 generated by the teacher data generation unit 12. In this example, the genuine pair F1-f1 is a genuine pair of the collected image of the latent fingerprint F1 and the collected image of the tenprint fingerprint f1, the same applies to other genuine pairs F2-f2 and F3-f3. Note that, while three genuine pairs are illustrated in FIG. 2B, more genuine pairs may be generated in the actual teacher data generation process.

Figure 3B:
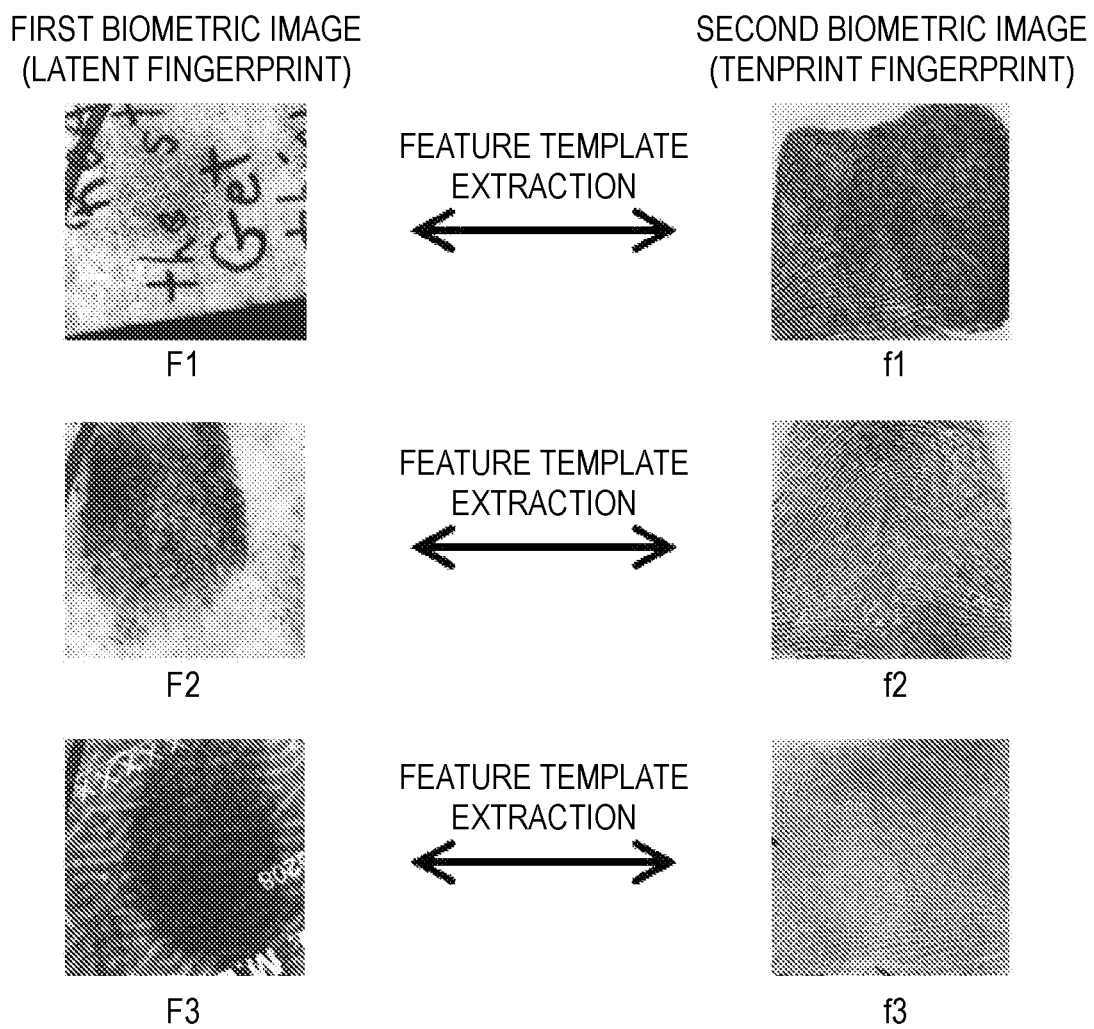
FIG. 3B is a diagram illustrating an example of a learning data generation process in the biometric recognition apparatus according to the first example embodiment.

FIG. 3A and FIG. 3B are diagrams illustrating an example of a learning data generation process in a biometric recognition apparatus according to the first example embodiment. The learning data generation unit 13 uses a plurality of different temporary parameters from the first biometric image and the second biometric image of a genuine pair used for teacher data generated by the teacher data generation unit 12 and generates a feature template used for learning data. In the present example embodiment here, a group of feature points (end points or branch points of fingerprint ridges) extracted from a collected image of a latent fingerprint or a tenprint fingerprint is a feature template used for learning data. FIG. 3B illustrates the first biometric image and the second biometric image of a genuine pair illustrated in FIG. 2B. While one example of a generation method of a feature template performed by the learning data generation unit 13 will be described below, the present example embodiment is not limited to such an example.

As illustrated in FIG. 3A, the learning data generation unit 13 uses temporary parameters to extract a feature point group G{N1, N2, . . . } from the collected image of the latent fingerprint F. Further, similarly, the learning data generation unit 13 uses temporary parameters to extract a feature point group g{n1, n2, . . . } from the collected image of the tenprint fingerprint f. As an extraction method of feature points, a known technology disclosed in Patent Literature 1 may be used, for example.

FIG. 3B illustrates feature point groups G1, G2, and G3 and feature point groups g1, g2, and g3 generated by the learning data generation unit 13 together with the latent fingerprints F1, F2, and F3 and the tenprint fingerprints f1, f2, and f3 of genuine pairs generated by the teacher data generation unit 12. In this example, the feature point group G1 is a group of feature points extracted from the collected image of the latent fingerprint F1 that is the first biometric image, and the feature point group g1 is a group of feature points extracted from the collected image of the tenprint fingerprint f1 that is the second biometric image. The same applies to other feature point groups G2, G3, g2, and g3. Note that, while three genuine pairs of the first biometric image and the second biometric image are illustrated in FIG. 3B, a feature template may be generated from more first biometric images and more second biometric images in the actual learning data generation process.

FIG. 4A and FIG. 4B are first diagrams illustrating an example of a score calculation process in the biometric recognition apparatus according to the first example embodiment. FIG. 4A illustrates feature point groups Ga1 to Ga3 extracted from the latent fingerprints F1 to F3, respectively, by the learning data generation unit 13 using a temporary parameter Pa. Further, similarly, FIG. 4A illustrates feature point groups ga1 to ga3 extracted from the tenprint fingerprints f1 to f3, respectively, by the learning data generation unit 13 using a temporary parameter pa.

As illustrated in FIG. 4A, the optimum solution determination unit 14 calculates a score Saij representing a similarity degree of a pair Gai-gaj of a feature point group for each combination of a feature point group Gai ("i" is a natural number) extracted from the first biometric image and a feature point group gaj ("j" is a natural number) extracted from the second biometric image.

At this time, the optimum solution determination unit 14 calculates not only a score representing a similarity degree of a pair of feature templates extracted from a genuine pair (hereinafter, referred to as "first score") but also a score representing a similarity degree of a pair of feature templates extracted from an imposter pair (hereinafter, referred to as "second score"). FIG. 4B illustrates the first score Saij(i=j) of a pair of feature templates extracted from a genuine pair in the upper part and the second score Saij(i≠j) of a pair of feature templates extracted from an imposter pair in the lower part.

FIG. 5A and FIG. 5B are second diagrams illustrating an example of a score calculation process in the biometric recognition apparatus according to the first example embodiment. FIG. 5A illustrates feature point groups Gb1 to Gb3 extracted from the latent fingerprints F1 to F3, respectively, by the learning data generation unit 13 using a temporary parameter Pb. Further, similarly, FIG. 5A illustrates feature point groups gb1 to gb3 extracted from the tenprint fingerprints f1 to f3, respectively, by the learning data generation unit 13 using a temporary parameter pb.

The optimum solution determination unit 14 calculates a score Sbij representing a similarity degree of a pair Gbi-gbj of a feature point group for each combination of a feature point group Gbi and a feature point group gbj as with FIG. 4B. FIG. 5B illustrates a score Sbij calculated by the optimum solution determination unit 14.

FIG. 6A and FIG. 6B are third diagrams illustrating an example of a score calculation process in the biometric recognition apparatus according to the first example embodiment. FIG. 6A illustrates feature point groups Gc1 to Gc3 extracted from the latent fingerprints F1 to F3, respectively, by the learning data generation unit 13 using a temporary parameter Pc. Further, similarly, FIG. 6A illustrates feature point groups gb1 to gb3 extracted from the tenprint fingerprints f1 to f3, respectively, by the learning data generation unit 13 using a temporary parameter pc.

The optimum solution determination unit 14 calculates a score Scij representing a similarity degree of a pair Gci-gcj of a feature point group for each combination of a feature point group Gci and a feature point group gcj as with FIG. 4B. FIG. 6B illustrates a score Scij calculated by the optimum solution determination unit 14.

Next, the optimum solution determination unit 14 calculates a score value representing a statistical separation degree between the first score representing a similarity degree of a pair of feature templates extracted from a genuine pair and the second score representing a similarity degree of a pair of feature templates extracted from an imposter pair. While one example of a calculation method of a score separation degree will be described below with reference to FIG. 7, a calculation method of a score separation degree of the present example embodiment is not limited to such an example.

FIG. 7 is a diagram illustrating an example of an optimum solution determination process in the biometric recognition apparatus according to the first example embodiment. The optimum solution determination unit 14 calculates the score Sij representing the similarity degree between the latent fingerprint Fi and a tenprint fingerprint fj by the following Equation (1) by differentiating weights (A, B, C) of the temporary parameter P. Here, values Saij, Sbij, and Scij denote scores illustrated in FIG. 4B, FIG. 5B, and FIG. 6B, and values A, B, and C denote weights of scores Saij, Sbij, and Scij, respectively.

$$Sij = A \times Saij + B \times Sbij + C \times Scij + \ldots \quad (1)$$

Note that, while the score Sij is calculated by using three combinations of weights of the temporary parameter P (1, 1, 1), (1, 2, 1), and (2, 1, 1) in FIG. 7, more combinations of weights of the temporary parameter P (A, B, C) may be used in the actual optimum solution determination process.

First, the optimum solution determination unit 14 calculates the first score Sij(i=j) representing the similarity degree of a pair of feature templates extracted from a genuine pair and the second score Sij(i≠j) representing a similarity degree of a pair of feature templates extracted from an imposter pair for each latent fingerprint Fi (first biometric image). FIG. 7 illustrates the calculated first score and second score for each latent fingerprint Fi. Note that the first score and the second score may be calculated for each tenprint fingerprint fj (second biometric image).

Next, the optimum solution determination unit 14 calculates, as a score separation degree S, a ratio of the latent fingerprint Fi (the first biometric image) whose first score is ranked top on a temporary parameter P(A, B, C) basis. Note that a ratio of the tenprint fingerprint fj (the second biometric image) whose first score is ranked top may be calculated as a score separation degree S on a temporary parameter P(A, B, C) basis. FIG. 7 illustrates the rank of the first score of the latent fingerprint Fi in parentheses.

Finally, the optimum solution determination unit 14 determines the temporary parameter P(A, B, C) having the maximum score separation degree S as the optimum solution. For example, in the example illustrated in FIG. 7, the temporary parameter P(1, 2, 1) having the maximum score separation degree S(=3/3) is determined as the optimum solution.

The parameter update unit 15 then updates the parameter stored in the storage unit 2 with the temporary parameter determined by the optimum solution determination unit 14 as the optimum solution. Thereby, the parameter stored in the storage unit 2 is optimized, which enables automatic optimization of the parameter used for extracting a feature template from a biometric image while operating the biometric recognition apparatus.

In particular, in the present example embodiment, the score separation degree S is calculated based on the first score representing a similarity degree of a pair of feature templates extracted from a genuine pair and the second score representing a similarity degree of a pair of feature templates extracted from an imposter pair. It is therefore possible to avoid determining, as the optimum solution, a temporary parameter in which the second score representing a similarity degree of a pair of feature templates extracted from an imposter pair, such as the temporary parameter (2, 1, 1) illustrated in FIG. 7, is calculated to be high. Note that the calculation method of the score separation degree is not limited to the determination using a ratio of the ranked top.

FIG. 8 is a diagram illustrating a flowchart of a biometric recognition method according to the first example embodiment. The biometric recognition method of the present example embodiment will be described below with reference to the flowchart illustrated in FIG. 8.

In step S101, the biometric image read unit 11 reads a biometric image registered in the storage unit as a database. In step S102, the teacher data generation unit 12 selects, out of a plurality of biometric images read from the biometric image read unit 11, a pair of biometric images determined as being based on the same finger as a genuine pair. In step S103, the learning data generation unit 13 uses a plurality of different temporary parameters from the first biometric image and the second biometric image used for teacher data generated by the teacher data generation unit 12 and generates a feature template used for learning data.

In step S104, the optimum solution determination unit 14 calculates a score separation degree on a temporary parameter basis based on the first score representing a similarity degree of a pair of feature templates extracted from a genuine pair and the second score representing a similarity degree of a pair of feature template extracted from an imposter pair. In step S105, the optimum solution determination unit 14 determines, as the optimum solution, a temporary parameter having the maximum score separation degree. In step S106, the parameter update unit 15 updates the parameter stored in the storage unit 2 with the temporary parameter determined as the optimum solution.

As described above, the biometric recognition apparatus of the present example embodiment calculates a score separation degree on a temporary parameter basis based on the first score representing a similarity degree of a pair of feature templates extracted from a genuine pair and the second score representing a similarity degree of a pair of feature template extracted from an imposter pair and then determines the temporary parameter in accordance with the level of the score separation degree. According to such a configuration, a biometric recognition apparatus and a fingerprint feature extraction method that can automatically optimize parameters used for extracting a feature template from a biometric image can be provided.

Other Example Embodiments

Note that each example embodiment described above is a mere embodied example in implementing the present invention, and the technical scope of the present invention should not be construed in a limiting sense by the example embodiments. That is, the present invention can be implemented in various forms without departing from the technical concept thereof or the primary feature thereof.

For example, the score of the genuine pair F2-f2 in the example embodiment described above is calculated to be high regardless of the value of the temporary parameter P (A, B, C) used for learning and thus hardly contributes to determination of the superiority or inferiority of a temporary parameter. Accordingly, the optimum solution determination unit 14 may remove a genuine pair whose score is greater than or equal to a predetermined value (for example, 1500) from the calculation process of a score separation degree. Thereby, when there are many genuine pairs having a large score, a processing load of the control calculation unit 1 in the calculation process of the score separation degree can be significantly reduced.

The present invention can also be realized by a process to supply a program implementing one or more functions of the example embodiment described above to a system or an apparatus via a network or a storage medium and read and execute the program by using one or more processors in a computer of the system or the apparatus. Further, the present invention can be realized by using a circuit that implements one or more functions (for example an ASIC).

The whole or part of the example embodiments disclosed above can be described as, but not limited to, the following supplementary notes.

Supplementary Note 1

A biometric recognition apparatus comprising:
a teacher data generation unit that generates a genuine pair and an imposter pair of a first biometric image and a second biometric image;
a learning data generation unit that uses a plurality of different temporary parameters to extract feature templates from the first biometric image and the second biometric image; and
an optimum solution determination unit that calculates a score separation degree on the temporary parameter basis based on a first score representing a similarity degree of a pair of the feature mounts extracted from the genuine pair and a second score representing a similarity degree of a pair of the feature templates extracted from the imposter pair and determines the temporary parameter based on a level of the score separation degree.

Supplementary note 2

The biometric recognition apparatus according to supplementary note 1, wherein the optimum solution determination unit determines the temporary parameter based on the score separation degree which is the largest.

Supplementary note 3

The biometric recognition apparatus according to supplementary note 1 or 2, wherein the optimum solution determination unit calculates the first score and the second score for each of the first biometric image or the second biometric image, and calculates, as the score separation degree, a ratio of the first score ranked top.

Supplementary note 4

The biometric recognition apparatus according to any one of supplementary notes 1 to 3, wherein the optimum solution determination unit removes the genuine pair having the first score greater than or equal to a predetermined value from a calculation process of the score separation degree.

Supplementary note 5

The biometric recognition apparatus according to any one of supplementary notes 1 to 4 further comprising:
a storage unit that stores a parameter used for extracting the feature templates from the first biometric image and the second biometric image; and
a parameter update unit that updates the parameter stored in the storage unit with the determined temporary parameter.

Supplementary note 6

The biometric recognition apparatus according to any one of supplementary notes 1 to 5,
wherein a pair of the first biometric image and the second biometric image is a pair of collected images of a fingerprint or a palm print, and
wherein the feature templates form a feature point group of a fingerprint or a palm print.

Supplementary note 7

The biometric recognition apparatus according to supplementary note 6, wherein a pair of the first biometric image and the second biometric image is a pair of a collected image of a latent fingerprint and a collected image of a tenprint fingerprint.

Supplementary note 8

The biometric recognition apparatus according to any one of supplementary notes 1 to 7, wherein the temporary parameter includes a combination of a noise reduction process and an enhancement process and a weight.

Supplementary note 9

A biometric recognition method used in a control calculation unit of a biometric recognition apparatus, the biometric recognition method comprising:
a teacher data generation step of generating a genuine pair and an imposter pair of a first biometric image and a second biometric image;
a learning data generation step of using a plurality of different temporary parameters to extract feature templates from the first biometric image and the second biometric image; and
an optimum solution determination step of calculating a score separation degree on the temporary parameter basis based on a first score representing a similarity degree of a pair of the feature mounts extracted from the genuine pair and a second score representing a similarity degree of a pair of the feature templates extracted from the imposter pair and determining the temporary parameter based on a level of the score separation degree.

Supplementary note 10

A computer readable storage medium storing a program that causes a computer to function as:
  a teacher data generation unit configured to generate a genuine pair and an imposter pair of a first biometric image and a second biometric image;
  a learning data generation unit configured to use a plurality of different temporary parameters to extract feature templates from the first biometric image and the second biometric image; and
  an optimum solution determination unit configured to calculate a score separation degree on the temporary parameter basis based on a first score representing a similarity degree of a pair of the feature templates extracted from the genuine pair and a second score representing a similarity degree of a pair of the feature templates extracted from the imposter pair and determine the temporary parameter based on a level of the score separation degree.

While the present invention has been described above with reference to the example embodiments, the present invention is not limited to the example embodiments described above. Various changes that can be appreciated by those skilled in the art within the scope of the present invention may be applied to the configuration or the detail of the present invention.

This application is based upon and claims the benefit of priority from Japanese Patent Application No. 2017-199167, filed on Oct. 13, 2017, the disclosure of which is incorporated herein in its entirety by reference.

REFERENCE SIGNS LIST 1 control calculation unit
2 storage unit
11 biometric image read unit
12 teacher data generation unit
13 learning data generation unit
14 optimum solution determination unit
15 parameter update unit

The invention claimed is:

1. A biometric recognition apparatus comprising:
  one or more processors;
  a memory storing instructions executable by the one or more processors to:
  generate, from a plurality of first biometric images and a plurality of second biometric images, a plurality of pairs that are each a combination of a respective one of the first biometric images and a respective one of the second biometric images, the plurality of pairs including a genuine pair and an imposter pair;
  use a plurality of different temporary parameters to extract feature templates from the first biometric image and the second biometric image of each pair;
  calculate a similarity degree of the feature templates extracted from the first biometric image and the second biometric image of each pair;
  calculate a first score representing the similarity degree of the feature templates extracted from the first biometric image of the genuine pair;
  in response to the first score being greater than or equal to a predetermined value, replace the genuine pair with a new genuine pair and recalculate the first score;
  calculate a second score representing the similarity degree of the feature templates extracted from the first biometric image and the second biometric image of the imposter pair;
  calculate a score separation degree on a temporary parameter basis based on the first score and the score second; and
  determine the temporary parameter based on a level of the score separation degree.

2. The biometric recognition apparatus according to claim 1, wherein the temporary parameter is determined based on the score separation degree that is largest.

3. The biometric recognition apparatus according to claim 1, wherein the first score is calculated for each first biometric image and the second score is calculated for each of the second biometric image, and the score separation degree is calculated a ratio of the first score that is top-ranked.

4. The biometric recognition apparatus according to claim 1, wherein the instructions are executable by the one or more processors to further:
  store a parameter used for extracting the feature templates from the first biometric image and the second biometric image of each pair; and
  update the parameter with the determined temporary parameter.

5. The biometric recognition apparatus according to claim 1,
  wherein each pair is a pair of collected images of a fingerprint or a palm print, and
  wherein the feature templates form a feature point group of the fingerprint or the palm print.

6. The biometric recognition apparatus according to claim 5, wherein each pair is a pair of a collected image of a latent fingerprint and a collected image of a tenprint fingerprint.

7. The biometric recognition apparatus according to claim 1, wherein the temporary parameter includes a combination of a noise reduction process and an enhancement process and a weight.

8. A biometric recognition method comprising:
  generating, by a processor and from a plurality of first biometric images and a plurality of second biometric images, a plurality of pairs that are each a combination of a respective one of the first biometric images and a respective one of the second biometric images, the plurality of pairs including a genuine pair and an imposter pair;
  using, by the processor, a plurality of different temporary parameters to extract feature templates from the first biometric image and the second biometric image of each pair;
  calculating, by the processor, a similarity degree of the feature templates extracted from the first biometric image and the second biometric image of each pair;
  calculating, by the processor, a first score representing the similarity degree of the feature templates extracted from the first biometric image of the genuine pair;
  in response to the first score being greater than or equal to a predetermined value, replacing, by the processor, the genuine pair with a new genuine pair and recalculate the first score;
  calculating, by the processor, a second score representing the similarity degree of the feature templates extracted from the first biometric image and the second biometric image of the imposter pair;
  calculating, by the processor, a score separation degree on a temporary parameter basis based on the first score and the score second; and determining, by the processor, the temporary parameter based on a level of the score separation degree.

9. A computer readable non-transitory storage medium storing a program that is executable by a computer to cause the computer to perform:
generating, from a plurality of first biometric images and a plurality of second biometric images, a plurality of pairs that are each a combination of a respective one of the first biometric images and a respective one of the second biometric images, the plurality of pairs including a genuine pair and an imposter pair;
using a plurality of different temporary parameters to extract feature templates from the first biometric image and the second biometric image of each pair;
calculating a similarity degree of the feature templates extracted from the first biometric image and the second biometric image of each pair;
calculating a first score representing the similarity degree of the feature templates extracted from the first biometric image of the genuine pair;
in response to the first score being greater than or equal to a predetermined value, replacing the genuine pair with a new genuine pair and recalculate the first score;
calculating a second score representing the similarity degree of the feature templates extracted from the first biometric image and the second biometric image of the imposter pair;
calculating a score separation degree on a temporary parameter basis based on the first score and the score second; and
determining the temporary parameter based on a level of the score separation degree.

* * * * *